United States Patent Office 3,140,995
Patented July 14, 1964

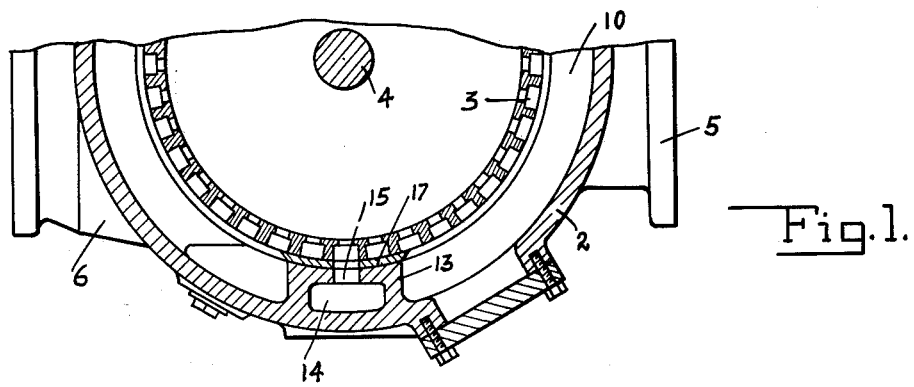
Fig.1.
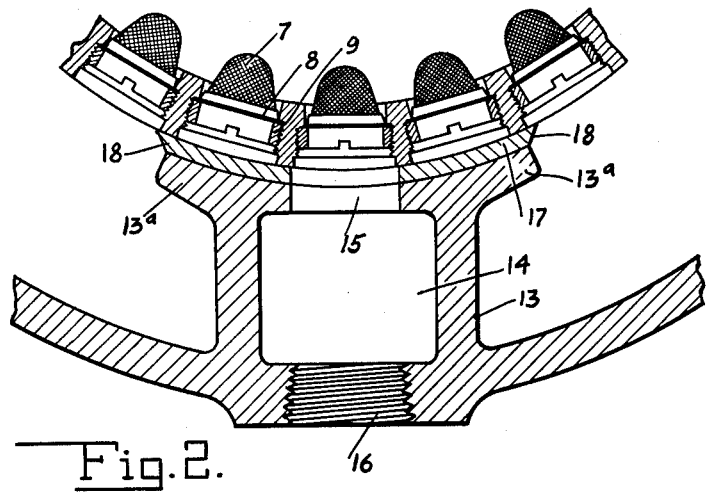
Fig.2.
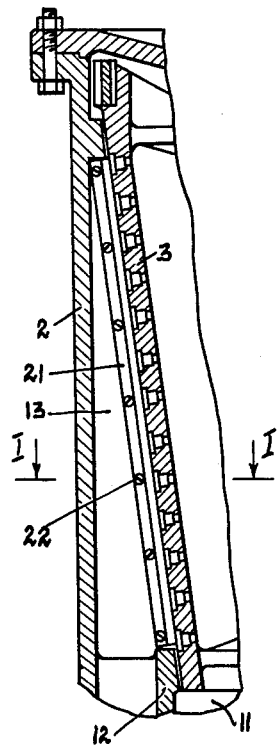
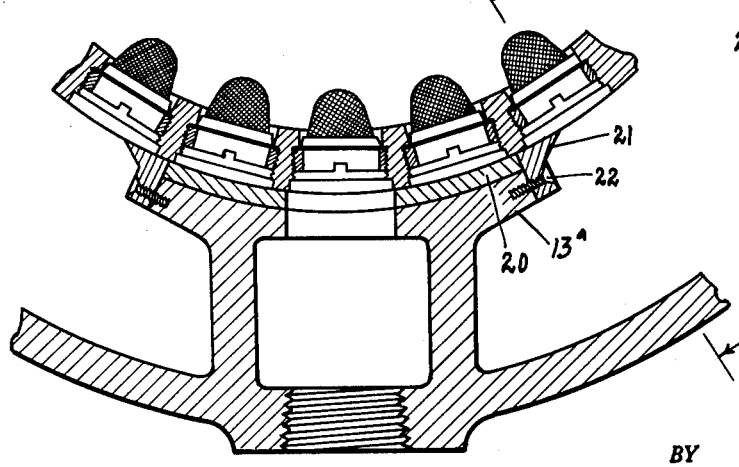
Fig.3.
Fig.4.
INVENTOR.
SELWYNE P. KINNEY.
BY
ATTORNEYS.

3,140,995
SELF-CLEANING ROTARY STRAINER
Selwyne P. Kinney, Pittsburgh, Pa., assignor to S. P. Kinney Engineers, Inc., Carnegie, Pa., a corporation of Pennsylvania
Filed Aug. 29, 1960, Ser. No. 52,622
1 Claim. (Cl. 210—393)

This invention is for an improvement in self-cleaning rotary strainers and relates particularly to a strainer of the type having a rotary drum concentrically positioned within a casing with straining media in the periphery of the drum, and wherein provision is made for introducing water to be strained around the outside of the casing, and the strained water is removed from the interior of the casing.

Strainers of this type are used in various industrial installations where the water may be withdrawn from rivers, creeks, or ponds. Frequently the dirty water to be strained carries leaves, sticks and other organic debris. This debris may become lodged in one of the strainer cups in the periphery of the drum. As the drum rotates, the strainer cups are carried past a backwash shoe, whereby water inside the drum may flow in a reverse direction through a limited number of strainer cups, and thereby reverse flush sediment and organic material from these cups. The backwash shoe has a close working fit against the surface of the drum so that there can be little leakage between the drum and the shoe. At times sticks of wood may become lodged in the strainer cups, interfering with the rotation of the drum when the stick projecting from the periphery of the drum comes into contact with the edge of the backwash shoe. This may result in overloading the driving motor, imposing an abnormal load on the driving gears, or creating a pressure that damages the strainer element against which the stick is lodged. In the case of leaves, paper and rags, or similar material, the movement of the drum to which such material is adhered by the water pressure may result in such material being jammed or compacted in the strainer cups to a point where the backwash pressure is insufficient to dislodge it, or it may create a drag on the rotation of the drum.

The present invention has for its principal object to provide a strainer in which the edge or edges of the backwash shoe have knives bearing against the drum against which any material carried on the surface of the drum and projecting from the strainer cups will be first contacted, thereby causing any such material to be sheared or cut off at the surface of the drum.

A further object of the invention is to provide a strainer of the type referred to having an improved back-flush shoe with a removable cutting edge which, from time to time, may be resharpened or replaced.

These and other objects and advantages of my invention may be more fully understood by reference to the accompanying drawings, in which:

FIG. 1 is a horizontal section through a strainer of the type to which the present invention relates, the view being in substantially the plane of line I—I of FIG. 4, the construction of the knife in FIG. 1, however, being different from that shown in FIG. 4;

FIG. 2 is an enlarged fragmentary view of that portion of the drum and backwash shoe shown in FIG. 1, the view being on a larger scale to more fully disclose the backwash shoe construction;

FIG. 3 is a view similar to FIG. 2 showing a slightly modified form of knife; and FIG. 4 is a vertical section in substantially the plane of line IV—IV of FIG. 3, but on a smaller scale, the view showing a side elevation of the backwash shoe and the knife blade.

The strainer disclosed in the present application is of the general type more fully shown in United States Letters Patent No. 2,371,760, or my joint application with others, Serial No. 637,685, filed February 1, 1957, and now Patent No. 2,956,683, issued October 18, 1960, wherein 2 designates a cylindrical casing having a vertical axis, and 3 is a strainer drum concentrically located in the casing 2, the drum being carried on a central shaft 4 which projects through the top of the casing, and which is usually motor-driven, the top of the shaft and the motor drive not being shown in the drawings. At the bottom of the casing near one side is a flanged inlet connection, and diametrically opposite it is a flanged outlet connection 6.

The drum 3 may be cylindrical, but more usually it is in the form of an inverted truncated cone. The periphery of the drum, except for the extreme top and bottom, is provided with vertical rows of openings over its entire area, and in each opening there is a strainer element. Typically, a strainer element may comprise a cup-like screen 7 having a rim 8 seated on a shoulder formed in the opening through the drum and retained in said seat by a removable ring nut 9 threaded into the outer end of the hole. Other media may be used in place of screen, as for example brass cups which are slitted, or perforated porcelain cups, perforated disks, and the like, the straining media per se forming no part of the present invention, and the manner of supporting the same in the periphery of the drum is well known in the art.

Between the periphery of the drum 3 and the inner wall of the casing 2 there is a water chamber 10 into which the water from the inlet connection 5 flows to substantially completely surround the drum. The dirty water in the space 10 flows through the straining media 7 in the periphery of the drum into the interior of the drum. As best seen in FIG. 4, and as more fully described in the aforesaid patent or patent application, the bottom of the drum is open and the strained water passes out through the open bottom of the drum into a chamber 11 to the outlet connection 6. The lower end of the drum bears against an annular sealing surface 12.

At one point on the inner wall of the casing 2 there is a vertical hollow rib structure 13 extending inwardly toward the periphery of the drum with its inner surface curved to conform to the curvature of the drum, this hollow rib providing a vertical water passage 14. There is a vertical slot 15 in the face of the structure which confronts the periphery of the drum, and through which water may flow from the interior of the drum through the slot 15 into the passage 14 to an outlet passage 16 into which a water-discharge pipe (not shown) may be screwed. The width of the slot 15 is substantially the same as the diameter of one of the ports through the drum, and it is susbtantially coextensive with the full height of the drum, or that area of the drum which is provided with strainer elements. The inner surface of the rib 13 has laterally-flaring extensions 13a at each side thereof. A bearing shoe 17, usually formed of bronze or other non-corrosive material, is secured against the inner face of the structure 13–13a, and the entire structure 13–13a, together with the wearing plate 17, is termed a "backwash shoe." The plate 17 has a slot therethrough registering with the slot 15. So much of the structure as has been described is known in the art.

According to the present invention as shown in FIG. 2, one and preferably both edges of the plate 17 are sharply beveled as indicated at 18, providing knives which bear against the surface of the drum 3. These knives or knife edges will be first contacted by any material protruding from the strainer cups outwardly beyond the periphery of the drum 3, and as the drum rotates, the knives will serve to shear or cut the protruding material so that the part which protrudes will drop to the bottom of the space 10 and be removed from time to time when the strainer is opened for cleaning. It has been found that such a knife will sever a stick of wood of substantial diameter, and it will cut away such material as paper and leaves and other debris which may become lodged into one or more of the strainer cups and project beyond the periphery of the drum. It substantially reduces the impact on the motor and the load on the driving gears, and pieces of broom handle inserted for test purposes have been sheared with surprising ease.

The knife may be provided on only one edge of the shoe, but as shown in the drawings, I prefer to place one on both vertical edges, since the drum may be rotated in either direction, or some operators may from time to time actually reverse the direction of rotation of the drum. By having knife edges along both edges of the wear plate, it is not necessary for the manufacturer to specify in which direction the drums are to be rotated.

While the knife edges may be formed directly on the wear plate 17, the arrangement shown in FIG. 3 may be provided. In this view the strainer construction per se is the same as that described above, and corresponding reference numerals has been used to designate corresponding parts. In this case, however, the wear plate designated 20, has edges which are radial to the center of rotation of the drum. Separate strips 21 with knife edges bearing against the periphery of the drum are bolted by bolts 22 to the flanges 13a of the backwash shoe construction. With this arrangement the wear plate 20 may be of a relatively softer metal, and separate cutting knives located at the edges of the wear plate may be of steel or other hard material. By having these knives separate from the wear plate and from the backwash shoe construction and secured thereto by bolts, they may be removed when the strainer is opened for repair and inspection, and either replaced with new knives, or the knives may be removed and sharpened without necessity of entirely removing the wear plate 20.

While I have shown and described one particular strainer construction and particular knife arrangements, it will be understood that this is by way of illustration and that the invention may be otherwise embodied in strainers of this general type within the contemplation of my invention and under the scope of the following claim.

I claim:

A rotary strainer comprising a casing with water inlet and outlet connections, a hollow rotary drum within the casing spaced from the interior walls of the casing, the water inlet connection communicating with the space between the casing and the drum, said drum having a smooth exterior surface with radial openings extending therethrough in the periphery thereof with recessed strainer elements in each opening whereby water may pass from the exterior of the casing to the interior, one end of the drum being in open communication with the outlet connection, a backwash shoe in the casing extending along that area of the periphery of the drum in which the strainer elements are provided, said backwash shoe fixedly bearing against the periphery of the drum, and a knife along at least one edge of the backwash shoe having a beveled cutting edge therealong fixedly bearing against the periphery of the drum and pointed in the direction opposite to the direction of rotation of the drum with the bevel sloping away from the drum whereby solid material retained in the recessed strainer elements projecting beyond the periphery of the drum is sheared away as each recessed straining element moves under the beveled cutting edge.

References Cited in the file of this patent

UNITED STATES PATENTS

| | | |
|---|---|---|
| 2,253,692 | De Grave | Aug. 26, 1941 |
| 2,378,757 | Durdin | June 19, 1945 |
| 2,956,683 | Kinney et al. | Oct. 18, 1960 |

FOREIGN PATENTS

| | | |
|---|---|---|
| 789,323 | Great Britain | Jan. 22, 1958 |